United States Patent [19]

Gago

[11] 4,293,426

[45] Oct. 6, 1981

[54] COATED CALCIUM PEROXIDE PARTICLES USEFUL IN THE TREATMENT OF WATER

[75] Inventor: Ignace Gago, Braine-l'Alleud, Belgium

[73] Assignee: Interox, Brussels, Belgium

[21] Appl. No.: 961,699

[22] Filed: Nov. 17, 1978

[30] Foreign Application Priority Data

Nov. 18, 1977 [LU] Luxembourg ............................ 78545

[51] Int. Cl.$^3$ .......................... C02F 1/72; B32B 19/04; B05D 7/00
[52] U.S. Cl. .................................... 210/759; 427/215; 427/220; 428/403; 428/404; 428/407
[58] Field of Search ............... 428/403, 402, 407, 404; 210/63 R, 759; 427/220, 221, 215

[56] References Cited

U.S. PATENT DOCUMENTS

| | | | |
|---|---|---|---|
| 3,336,155 | 8/1967 | Rowe | 428/407 |
| 3,477,947 | 11/1969 | Kappe | 210/3 |
| 3,666,486 | 5/1972 | Hodgson | 99/91 |
| 3,847,830 | 11/1974 | Williams et al. | 428/403 |
| 3,967,039 | 6/1976 | Ninane et al. | 428/403 |
| 3,992,317 | 11/1976 | Brichard et al. | 427/221 |
| 3,992,558 | 11/1976 | Smith-Johannsen | 428/407 |
| 4,105,827 | 8/1978 | Brichard | 428/403 |
| 4,136,052 | 1/1979 | Mazzola | 428/403 |

FOREIGN PATENT DOCUMENTS 49-27799  7/1974  Japan .

*Primary Examiner*—William R. Dixon, Jr.
*Attorney, Agent, or Firm*—Spencer & Kaye

[57] ABSTRACT

Solid particles containing calcium peroxide and coated with a coating agent containing a water-insoluble solid compound having a melting point of at least 50° C.

The particles can be used in the treatment of water and make it possible to ensure sufficient oxygenation for very long periods.

30 Claims, No Drawings

COATED CALCIUM PEROXIDE PARTICLES USEFUL IN THE TREATMENT OF WATER

BACKGROUND OF THE INVENTION

The present invention relates to solid particles containing calcium peroxide, to a process for their manufacture, and to their use in the treatment of water.

Calcium peroxide constitutes a very valuable source of active oxygen. In the form of an anhydrous solid, the product decomposes only very slightly under the action of heat. In an aqueous medium, on the other hand, it decomposes and liberates active oxygen. When the product is in powder form, this hydrolysis is particularly rapid at pH values below 10, so that the product becomes inactive just a few minutes after it has been brought into contact with the aqueous medium. Thus, the product cannot be suitable of the oxygenation of water when a long-term action is essential. Furthermore, granulation of the product does not reduce the hydrolysis rate sufficiently to permit its use in the treatment of water.

It is known to use uncoated particles of calcium peroxide in fish culture to oxygenate breeding ponds in order to aid the growth of vegetable plankton, as disclosed in Japanese Publication No. 27,799/74. It is also known to "encapsulate" calcium peroxide by means of liquid or pastry compounds in order to obtain an additive useful in the baking of bread, as disclosed in U.S. Pat. No. 3,666,486. The coating agent is heat dispersible at a temperature of less than 50° C. and disappears, so that the calcium peroxide is liberated, when the bread dough is worked.

SUMMARY OF THE INVENTION

It is a primary object of the present invention to provide solid particles containing calcium peroxide and having a greatly reduced hydrolysis rate in an aqueous medium, that is, the rate of decomposition of the calcium peroxide in an aqueous medium to give active oxygen and molecular oxygen.

This and other objects are achieved according to the present invention by coating solid particles containing calcium peroxide with a coating agent containing a water-insoluble solid compound having a melting point of at least 50° C.

In particles according to the invention, the coating agents can constitute a continuous or non-continuous layer arranged around the particle, whose core essentially consists of calcium peroxide or can serve as a binder for agglomerating elementary fine particles. In this case, each of the elementary fine particles of calcium peroxide is enclosed by a continuous or non-continuous layer of coating agent.

The term water-insoluble solid compound is to be understood as denoting compounds having a solubility in water of less than 1%, generally less than 0.1% and preferably less than 0.01%, by weight, and which are solid under normal conditions of temperature and pressure.

The coating agent generally consists of at least 80% by weight of the insoluble solid compound, it being possible for any remainder to consist of various additives which depend, inter alia, on the use for which the particles are intended. Thus, additives which make it possible to reduce attrition or additives which influence the pH can be added.

The insoluble solid compounds present in the particles according to the invention can be chosen from among organic and inorganic compounds.

The inorganic compounds are generally chosen from among water-insoluble silicates, sulphates, aluminates, alumino-silicates, carbonates and phosphates of all types, such as conventional phosphates, polyphosphates and, more particularly, tripolyphosphate and metaphosphates. Calcium salts are very suitable. Among these, the calcium salts of all types of phosphate give good results.

In order to produce the coating, the inorganic compounds are frequently employed in the form of their alkali metal salts which are their precursors. Once present in the agent for coating the calcium peroxide particles, they are converted, at least partially, into the corresponding calcium salts.

The organic compounds can be of very different types. In general, water-insoluble polymers are used. Polymers which are advantageously employed have good film-forming properties and possess a definite, although low, permeability to hydroxyl and hydroxonium ions when they are used in the form of films. The polymers employed can be homo- or co-polymers; mixtures of polymers can also be used. The polymers can be chosen from among vinyl polymers and condensation polymers. Very suitable condensation polymers which may be mentioned are epoxy resins, polyurethanes and insoluble polyesters and polyamides. Vinyl polymers which may be more particularly mentioned are polymers containing monomeric units derived from monomers chosen from among mono- or poly-unsaturated olefines which are unsubstituted or substituted by substituents chosen from among halogen atoms, such as chlorine and fluorine, and alkyl, aryl and cycloalkyl groups. These polymers can be homo- or co-polymers. In the latter case, they can additionally contain monomeric units derived from monomers chosen from among olefines which are substituted by substituents chosen from among hydroxyl, carbonitrile and carboxyl groups and carboxylic acid salts or esters, and also, possibly simultaneously, by alkyl or aryl groups.

Vinyl polymers are generally very suitable. Among these, vinyl copolymers, and more particularly copolymers containing monomeric units chosen from among those derived from vinylidene chloride, styrene and vinyl chloride, have proved advantageous. Good results have been obtained with copolymers of vinylidene chloride with at least one comonomer chosen from among ethylene, the acrylates and methacrylates of alkali metals, of ammonium or of alkyl containing from 1 to 4 carbon atoms, acrylic and methacrylic acids, acrylonitrile and methacrylonitrile, vinyl alcohol and vinyl chloride, copolymers of styrene with at least one comonomer chosen from among acrylic and methacrylic acids, the acrylates and methacrylates defined above, butadiene and vinyl alcohol, and copolymers of vinyl chloride with vinyl alcohol. The best results have been obtained with copolymers of vinylidene chloride with other monomers, and more particularly with the copolymer of vinylidene chloride with methyl acrylate.

In the case where copolymers of vinylidene chloride with methyl acrylate are used as the coating agent, the methyl acrylate is generally present in the copolymer in an amount of 1 to 50%, and preferably 2 to 20%, of the weight of the copolymer.

The coating agent is generally present in an amount of 0.1 to 20%, and preferably 0.2 to 10%, of the weight of the particles.

The coated particles of calcium peroxide generally contain from 8 to 20%, and most frequently from 10 to 19%, by weight of active oxygen.

The calcium peroxide particles can contain, in addition to the coating agent, small amounts of various additives which do not generally exceed 10% of the weight of the particles. These additives especially include stabilizers. The particles can additionally contain small amounts of calcium carbonate which do not generally exceed 20% of the weight of the particles.

The calcium peroxide particles according to the invention can have widely varying dimensions. Their diameter is generally greater than 0.01 mm and is most frequently between 0.01 and 50 mm. As stated above, the particles can either be in the form of granules, the outer layer of which contains the coating agent, or in the form of agglomerates of elementary fine particles bonded to one another by the coating agent. These agglomerates can be in any form such as pellets, lozenges and tablets.

When the calcium peroxide particles according to the invention are in the form of agglomerates, they can be manufactured by the dry mixing of fine particles of calcium peroxide and of coating agent or its precursor in the desired proportions. The dry mixing can be carried out in any known mixer and is followed by a compacting process which is intended to agglomerate the fine particles to one another in order to form the particles according to the invention. For this purpose, it is possible to use any known compactor which is capable of exerting a sufficient pressure. The pressure exerted during the compacting process is preferably greater than 50 kg/cm$^2$. Very suitable apparatuses are pelletizers and roller-type compactors. After the compacting process, the particles can also be ground in order to bring them to the dimensions desired for their use.

Another technique consists in agglomerating the fine particles of calcium peroxide by means of a solution or suspension of the coating agent or of its precursors in an appropriate solvent. This treatment can be carried out in various types of apparatus, which are in themselves known, such as fluid-bed dryers or drum-dryers.

The fine particles used in the agglomeration processes generally have a mean diameter of between 0.1 and 300 microns, and most frequently between 1 and 100 microns.

DESCRIPTION OF THE PREFERRED EMBODIMENTS

According to one preferred embodiment of the invention, the calcium peroxide particles are in the form of granules, the outer layer of which contains the coating agent.

The present invention also relates to a process for the manufacture of calcium peroxide particles of this type. The process consists in spraying, onto moving calcium peroxide granules, a solution, emulsion or suspension of the coating agent or of its precursors in a liquid medium, and in evaporating the liquid medium.

When the coating agent is an inorganic compound, it is generally employed in the form of an aqueous solution of one of its precursors, which is preferably the corresponding soluble alkali metal salt.

When the coating agent is an organic compound, preferably a polymer according to preferred embodiments, and if it is employed in the form of a solution in a liquid medium containing a solvent or a mixture of solvents for the coating agent, the nature of the chosen solvent or solvents depends on the polymer used as the coating agent. A list of appropriate solvents for the various coating agents of the process of the invention is given in the book by J. Brandrup and E. H. Immergut, Polymer Handbook, Interscience. Among these solvents, those which are preferably chosen have a boiling point which is not too high relative to the decomposition point of the coating agent. The solvents which are generally chosen are those having a boiling point which does not exceed 150° C. under a pressure of one atmosphere.

When the organic coating agent is employed in the form of an emulsion or suspension in a liquid medium, it is preferred, for economic reasons, to use water as the main constituent of the liquid medium. Of course, other liquid media can also be suitable.

The organic coating agent is advantageously employed in the form of an emulsion in water.

The concentration, in the liquid medium, of the organic or inorganic coating agent or of its precursors can vary within fairly wide limits and is generally between 1 and 70% by weight of the total weight of the liquid phase constituting the coating agent and the liquid medium. The concentration which is preferably used is as close as possible to the concentration at which a solid phase is observed to separate out, under the temperature conditions used, but without reaching concentrations at which the liquid phase is so viscous that it cannot be used. The concentrations which are preferably used are such that the viscosity of the liquid phase containing the coating agent does not exceed 100 centipoises.

Of course, the liquid medium can contain various additives, the concentration of which does not generally exceed 20% of the weight of the medium, and which can, in particular, be intended for stabilizing the liquid phase. Thus, surface-active, or surface tension modifying, agents can advantageously be added thereto when the liquid phase is an emulsion or suspension.

The liquid phase is generally employed at a temperature between ambient temperature and a temperature which is slightly higher than that of the granules onto which it is sprayed. The temperature of the liquid phase is generally between ambient temperature of 25° C. above the temperature of the granules onto which it is sprayed.

The temperatures at which the spraying and evaporation are carried out are lower than the decomposition point of the coating agent and generally lower than 100° C. For the evaporation, temperatures of between 25° and 95° C. are generally used.

The spraying can be carried out in accordance with various techniques, for example in a fluidized bed, on a rotating floor, in a rotary drum or in any other analogous device which is in itself known.

The evaporation can be carried out at the same time and in the same enclosure as the spraying or in a separate apparatus. The operation is generally carried out in a continuous process. A device such as a fluid bed, or any other device which is in itself known, can be suitable. In this case, the temperature of the fluid bed is between 30° and 85° C.

The use of a fluid bed has proved particularly advantageous, on the one hand because the spraying and evaporation can be carried out simultaneously in the same apparatus, and on the other hand because this technique makes it possible to produce a more leaktight and more homogeneous coating.

As the fluidizing gas, any inert gas, and in particular air, can be used. This gas can be heated in order to keep the fluid bed at the desired temperature. It is also possible to use other means of heating, such as a bundle of tubes placed in the fluid bed.

It is also possible to carry out the operation in accordance with a process which is similar but discontinuous.

The calcium peroxide particles according to the invention hydrolyze much less rapidly in natural water than uncoated calcium peroxide. Furthermore, the coating technique used for their preparation offers the advantage that it enables the coating agent to be applied while employing only small amounts of coating agent, which makes it possible to obtain a product having a high content of active oxygen. Moreover, since the liquid medium containing the coating agent is used in a very small amount, the evaporation requires only a small amount of heat.

The present invention also relates to the use of the particles according to the invention in the treatment of water. These particles are very particularly suitable for the oxygenation of water under conditions in which it is not possible to carry out oxygenation with agitation. They can advantageously be arranged in filters for drinking water. They are generally employed in proportions which make it possible to ensure from 0.01 to 100 g of active oxygen per $m^3$ of water to be treated, that is to say about 0.05 to 1,000 g of calcium peroxide per $m^3$ of water to be treated.

The use of the particles according to the invention in the treatment of drinking water presents a large number of advantages. It makes it possible to greatly reduce the fermentations which appear on the filters, and that makes it possible to increase their working life. In addition, if the water contains metal ions, such as, for example, iron or magnesium ions, these are converted into insoluble compounds which separate out from the water onto the filters. Moreover, if the water treated is slightly acid, the presence of the particles according to the invention additionally makes it possible to ensure the calcium and carbonic acid equilibrium in the water after filtration.

The particles according to the invention can also be used advantageously for the oxygenation of the hypolimnion of artificial or natural lakes or ponds used as reserves for drinking water. In fact, the concentration of oxygen in this lower layer of lakes is very low and the processes which are currently being perfected for oxygenating the hypolimnion are not satisfactory, either because they cause excessive agitation and bring to the surface unstable nutritive substances which cause more and more growth of algae, or because they do not make it possible to ensure sufficient oxygenation, which leads to stagnation of the water and the appearance of putrefaction phenomena which rapidly render the water unfit for consumption.

The particles according to the invention can also be used for removing the excess chlorine and/or hypochlorite present in water which has undergone a previous chlorination treatment.

Finally, the particles according to the invention can be used advantageously in the treatment of waste water. In this case, it is of particular value to introduce them into the settling tanks for purifying the waste water, in order to avoid putrid fermentations in the settling tank sludge, while not causing any agitation which detract from the settling process itself. In this case, an appreciable reduction in the settling times is also observed.

The particles according to the invention exhibit the advantage that they retain their activity for a fairly long time when they are used for oxygenating various types of water, both drinking water and sewage water, even when the latter is at temperatures greater than ambient temperature.

The examples below serve to provide a better understanding of the invention and to show the remarkable results obtained when using the coating agents according to the invention, without however limiting the scope of the invention to the embodiments described.

Example A represents a method for the preparation of the coated particles of calcium peroxide. Examples B and C illustrate the appreciable reduction in the rate of hydrolysis of the calcium peroxide particles after coating.

EXAMPLE A

Process for the manufacture of coated particles of calcium peroxide

The calcium peroxide granules employed are manufactured by reacting hydrogen peroxide with lime. The granules used have an active oxygen content of 16.1%.

The pre-formed granules were coated by a discontinuous process in a fluidized bed.

The apparatus used consists of a cylinder having a diameter of 15 cm and a height of 77 cm, which is equipped at its base with a plate for distributing the gas (2 mm holes) and equipped with a bundle of tubes for heating by means of steam which has been expanded to an effective pressure of 1 $kg/cm^2$.

3 kg of homogeneous granules of calcium peroxide, having dimensions between 1.19 and 2.38 mm and an apparent density equal to 0.807 $g/cm^3$, measured by the free flow method, are initially introduced.

Air is passed through the plate for distributing the gases and 250 g of an aqueous emulsion of a copolymer of vinylidene chloride (91%) and methyl acrylate (9%), containing 24% of solids, are introduced by means of a pneumatic sprayer, or atomizer, placed on the wall, 11 cm from the bottom. The temperature of the coating emulsion is 20° to 25° C.

The height of the bed is 25 cm and its temperature is 65° to 70° C.

After introduction of the coating emulsion, the coated particles of calcium peroxide are drawn off from the apparatus.

The product obtained contains 2% by weight of coating material; its apparent density is 0.812 $g/cm^3$, measured by the free flow method, and its active oxygen content is 15.8%.

EXAMPLE B

Kinetics of formation of active oxygen by hydrolysis of calcium peroxide (Experiments 1R to 11)

This Example involves a series of experiments which will be described in detail below. The experiments identified with an "R" constitute comparative tests employing prior art products.

Experiments 1R, 2R, 5R, 6R, 9R and 10R were carried out, by way of comparison, using uncoated calcium peroxide, in the form of a powder in Experiments 1R, 5R and 9R, and in the form of granules in Experiments 2R, 6R and 10R. Experiments 3, 4, 7, 8 and 11 were carried out with calcium peroxide particles according to the invention which had been coated, in Experiments 3, 7 and 11, with 2% and, in Experiments 4 and 8, with 5%, of a copolymer of vinylidene chloride and methyl acrylate, in accordance with the process described in Example A.

The calcium peroxide was hydrolyzed in a 2 liter reactor equipped with a mechanical stirrer, under a nitrogen atmosphere, in the presence of a reducing solution which was buffered in order to fix the pH at different values. After introduction of a definite amount of calcium peroxide into the medium, 20 cm³ samples of solution were periodically taken, and the active oxygen liberated therein was determined by iodometry (0.1 N thiosulphate solution).

Experiments at a pH of about 2 (Experiments 1R, 2R, 3 and 4)

The reducing solution was obtained as follows. 200 g of $NaH_2PO_4$ were added to 1,250 cm³ (Experiment 1R) or 1,500 cm³ (Experiments 2R, 3 and 4) of a 0.1 N solution of ferrous sulphate in sulphuric acid and the volume was brought up to 2 liters by adding distilled water. 7.322 g of calcium peroxide were then introduced.

The results obtained are summarized in Table 1 below.

TABLE 1

Liberation of active oxygen by hydrolysis of calcium peroxide at pH 2 (2.1-2.4) in the presence of ferrous sulphate

| $CaO_2$ | 1R Powder | 2R Granules 1.19-2.38 mm | 3 Particles coated with 2% of coating material | 4 Particles coated with 5% of coating material |
|---|---|---|---|---|
| Initial Active O in mg | 975 | 1,175 | 1,150 | 1,115 |
| Active O liberated in mg after 0 minutes | 0 | 0 | 0 | 0 |
| 1 | 909.7 | | | |
| 2 | | 24.1 | | |
| 4 | | | 17.1 | 0 |
| 5 | 942 | | | |
| 8 | | 56.4 | | |
| 10 | 942 | | 17.1 | |
| 25 | 948.4 | | | |
| 30 | | 128.8 | | 0 |
| 60 | | 209.4 | 34.3 | |
| 85 | 954.8 | | | |
| 120 | | 306 | | 8.4 |
| 180 | | | 94.3 | |
| 210 | 954.8 | | | |
| 240 | | 443 | | 16.8 |
| 300 | 961.3 | | | |
| 320 | | 499.3 | 145.7 | |
| 420 | | | | 25.2 |
| 440 | | 563.7 | | |
| 1,320 | | | 385.7 | |
| 1,380 | | | | 218.2 |
| 1,420 | | 676.5 | | |
| 1,440 | | | 394.3 | |
| 1,500 | | | | 243.3 |
| 1,540 | | 684.5 | | |

Experiments at a pH of about 8 (Experiments 5R, 6R, 7 and 8)

The reducing solution was obtained as follows.

$NaHCO_3$ was added to 1,250 cm³ (Experiments 5R and 6R) or 1,500 cm³ (Experiments 7 and 8) of 0.1 N $As_2O_3$ solution in an excess amount, relative to saturation, and the volume was brought up to 2 liters by adding distilled water. 7.322 g of calcium peroxide were then introduced.

The results obtained are summarized in Table 2 below.

TABLE 2

Liberation of active oxygen by hydrolysis of calcium peroxide at pH 8 (7.7-9) in the presence of $As_2O_3$

| $CaO_2$ | 5R Powder | 6R Granules 1.19-2.38 mm | 7 Particles coated with 2% of coating material | 8 Particles coated with 5% of coating material |
|---|---|---|---|---|
| Initial Active O in mg | 975 | 1,175 | 1,150 | 1,115 |
| Active O liberated in mg after 0 minutes | 0 | 0 | 0 | 0 |
| 1 | 791.1 | | | |
| 4 | | | 8 | |
| 5 | | 45.1 | | |
| 10 | | 64.5 | | |
| 12 | | | 8 | |
| 14 | 873.4 | | | |
| 16 | | | | 0 |
| 30 | 873.4 | 84 | | |
| 60 | | | 16.1 | |
| 120 | | 122 | | 0 |
| 135 | 936.7 | | | |
| 180 | | | 24.1 | |
| 195 | 949.4 | | | |
| 240 | | 142 | | |
| 300 | | | 24.1 | 8.1 |
| 320 | | 155 | | |
| 420 | | 161.3 | 32.2 | |
| 480 | | | | 16.2 |
| 1,320 | | | 48.3 | |
| 1,350 | | 213 | | |
| 1,380 | | | | 24.3 |
| 1,560 | | 219.3 | | |
| 1,680 | | 219.3 | | |
| 1,830 | | 219.3 | | |

Experiments at a pH of about 10 (Experiments 9R, 10R and 11)

The reducing solution was obtained as follows.

5 g of $Na_2B_4O_7$ were added to 1,250 cm³ (Experiment 9R) or 1,500 cm³ (Experiments 10R and 11) of 0.1 N $As_2O_3$ solution and 10 N sodium hydroxide solution and distilled water were also added to bring the volume to 2 liters and the pH to 10. 7.322 of calcium peroxide were then introduced.

The results obtained are summarized in Table 3 below.

TABLE 3

Liberation of active oxygen by hydrolysis of calcium peroxide at pH 10 (9.9-10.4) in the presence of $As_2O_3$

| $CaO_2$ | 9R Powder | 10R Granules 1.19-2.38 mm | 11 Particles coated with 2% of coating material |
|---|---|---|---|
| Initial active O in mg | 975 | 1,175 | 1,150 |
| Active O liberated in mg after 0 minutes | 0 | 0 | 0 |
| 1 | 425.8 | | |
| 4 | | 24.3 | |
| 7 | 716.1 | | |

TABLE 4

Active oxygen and molecular oxygen liberated with time

| CaO$_2$ | Granules 1.19–2.38 mm | | | Particles coated with 2% of coating material | | | Particles coated with 5% of coating material | | |
|---|---|---|---|---|---|---|---|---|---|
| Initial active O in g/kg | 170 | | | 173 | | | 167 | | |
| | Active O liberated in % | Residual active O in % | Molecular O$_2$ in % | Active O liberated in % | Residual active O in % | Molecular O$_2$ in % | Active O liberated in % | Residual active O in % | Molecular O$_2$ in % |
| | Experiment 12R | | | Experiment 15 | | | Experiment 18 | | |
| 5 hours | 10.9 | 73 | 16.1 | 2.5 | 90 | 7.7 | 0.7 | 92.8 | 6.5 |
| | Experiment 13R | | | Experiment 16 | | | Experiment 19 | | |
| 24 hours | 15.4 | 41.5 | 43.1 | 3.8 | 73 | 23.2 | 2.0 | 89.3 | 8.7 |
| | Experiment 14R | | | Experiment 17 | | | Experiment 20 | | |
| 3 days | 16.1 | 21.5 | 62.4 | 7.6 | 48.8 | 43.6 | 2.0 | 80.5 | 17.5 |

TABLE 3-continued

Liberation of active oxygen by hydrolysis of calcium peroxide at pH 10 (9.9–10.4) in the presence of As$_2$O$_3$

| | 9R | 10R | 11 |
|---|---|---|---|
| CaO$_2$ | Powder | Granules 1.19–2.38 mm | Particles coated with 2% of coating material |
| Initial active O in mg | 975 | 1,175 | 1,150 |
| 10 | | | 0 |
| 15 | 800 | 40.5 | |
| 25 | 838.7 | | |
| 30 | | 56.7 | |
| 35 | 851.6 | | |
| 60 | | 64.8 | |
| 75 | 883.9 | | |
| 120 | | | 0 |
| 150 | 916.1 | | |
| 180 | | 81 | |
| 245 | 929 | | |
| 300 | | 97.3 | |
| 320 | 942 | | |
| 360 | | | 0 |
| 1,240 | | | 8.3 |
| 1,320 | | 121.6 | |

Examination of Tables 1, 2 and 3 shows that coating the calcium peroxide particles according to the invention makes it possible to reduce the rate of liberation of active oxygen very substantially, regardless of the pH in question.

EXAMPLE C

Kinetics of formation of active oxygen and of molecular oxygen by hydrolysis of calcium peroxide (Experiments 12R to 20)

Experiments 12R, 13R and 14R were carried out, by way of comparison, using uncoated granules of calcium peroxide. Experiments 15 to 20 were carried out according to the invention using calcium peroxide particles which had been coated, in Experiments 15–17, with 2% and, in Experiments 18–20, with 5%, of the copolymer described in Example A.

The experiments were carried out at 24° C. and at pH 8.5 in a 2 liter reactor equipped with a mechanical stirrer, under a nitrogen atmosphere, in the presence of a buffered reducing solution containing 777.5 cm$^3$ of 0.1 N As$_2$O$_3$ solution, which had been brought up to 1 liter and treated with an excess of NaHCO$_3$, relative to saturation. 3.661 g of calcium peroxide were introduced into the reactor and, after a given operating time, the active oxygen liberated was determined by iodometry (0.1 N thiosulphate solution) and the active oxygen which was still present in the particles (residual active oxygen) was determined. The molecular oxygen liberated is obtained by difference computation. The results obtained are summarized in Table 4.

Examination of Table 4 shows a substantial reduction in the hydrolysis of calcium peroxide to give active oxygen and molecular oxygen after coating according to the invention.

It will be understood that the above description of the present invention is susceptible to various modifications, changes and adaptations, and the same are intended to be comprehended within the meaning and range of equivalents of the appended claims.

What is claimed is:

1. Solid particles comprising calcium peroxide, and a coating agent coating the calcium peroxide, said coating agent being predominantly a water-insoluble solid compound which is an organic polymer or an inorganic compound, said water-insoluble solid compound having a solubility in water of less than 1% by weight and a melting point of at least 50° C.

2. Solid particles according to claim 1 wherein the polymer is a polymer containing monomeric units derived from monomers selected from the group consisting of substituted and unsubstituted mono- and poly-unsaturated olefines.

3. Solid particles according to claim 2 wherein the olefines are substituted by substituents selected from the group consisting of halogen atoms and alkyl, aryl and cycloalkyl groups.

4. Solid particles according to claim 3 wherein the substituents are chlorine or fluorine atoms.

5. Solid particles according to claim 1 wherein the polymer is a vinyl copolymer containing monomeric units derived from monomers selected from the group consisting of vinylidene chloride, styrene and vinyl chloride.

6. Solid particles according to claim 5 wherein the vinyl copolymer is a copolymer of vinylidene chloride with methyl acrylate.

7. Solid particles according to claims 1, 2, 3, 4, 5 or 6 wherein they contain from 0.1 to 20% by weight of coating agent.

8. Solid particles according to claims 1, 2, 3, 4, 5, or 6 wherein said coating agent is in the form of an outer layer of each particle.

9. Solid particles according to claim 1 wherein the inorganic compound is selected from the group consisting of phosphates, silicates, sulfates, aluminates, alumino-silicates, and carbonates.

10. Solid particles according to claim 9, wherein the inorganic compound comprises a phosphate.

11. Solid particles according to claim 10 wherein the phosphate is selected from the group consisting of tripolyphosphates and metaphosphates.

12. Solid particles according to claim 1 which comprise a plurality of fine calcium peroxide particles agglomerated by the coating agent.

13. Process for the production of solid particles in a medium containing, the solid particles comprising calcium peroxide and a coating agent coating the calcium peroxide, said coating agent being predominantly a water insoluble solid compound having a solubility in water of less than 1% by weight and a melting point of at least 50° C., comprising spraying a solution, emulsion or suspension of a composition forming the coating agent in a liquid medium onto moving calcium peroxide granules, and evaporating the liquid medium.

14. Process for the oxygenation of water, comprising treating each $m^3$ of water with 0.05 to 1,000 g of solid particles comprising calcium peroxide and a coating agent coating the calcium peroxide, said coating agent being predominantly a water insoluble solid compound having a solubility in water of less than 1% by weight and a melting point of at least 50° C.

15. A process according to claim 14, wherein the process is applied to the oxygenation of potable waters, in which the solid particles containing calcium peroxide are disposed in potable water filters.

16. A process according to claim 14, wherein the process is applied to the oxygenation of potable water reservoirs.

17. A process according to claim 14, wherein the process is applied to the oxygenation of waters containing a chlorination agent selected from the group consisting of chlorine and sodium hypochlorite.

18. A process according to claim 14, wherein the process is applied to the oxygenation of waste waters.

19. Process according to claim 14 wherein the solid particles comprise a plurality of fine calcium peroxide particles agglomerated by the coating agent.

20. Process according to claim 13 or 14 wherein the water insoluble compound is an organic polymer or an inorganic compound.

21. Process according to claim 20 wherein the polymer is a polymer containing monomeric units derived from monomers selected from the group consisting of substituted and unsubstituted mono- and poly-unsaturated olefines.

22. Process according to claim 21 wherein the olefines are substituted by substituents selected from the group consisting of halogen atoms and alkyl, aryl and cycloalkyl groups.

23. Process according to claim 22 wherein the substituents are chlorine or fluorine atoms.

24. Process according to claim 20 wherein the polymer is a vinyl copolymer containing monomeric units derived from monomers selected from the group consisting of vinylidene chloride, styrene and vinyl chloride.

25. Process according to claim 24 wherein the vinyl copolymer is a copolymer of vinylidene chloride with methyl acrylate.

26. Process according to claim 20, wherein the solid particles contain from 0.1 to 20% by weight of coating agent.

27. Process according to claim 20, wherein said coating agent is in the form of an outer layer of each particle.

28. Process according to claim 20 wherein the inorganic compound is selected from the group consisting of phosphates, silicates, sulfates, aluminates, aluminosilicates and carbonates.

29. Process according to claim 28 wherein the inorganic compound comprises a phosphate.

30. Process according to claim 29 wherein the phosphate is selected from the group consisting of tripolyphosphates and metaphosphates.

* * * * *